United States Patent [19]

Goebel et al.

[11] Patent Number: 4,684,588

[45] Date of Patent: Aug. 4, 1987

[54] ELECTROCHEMICAL CELL WITH CONTAINER SUPPORT

[75] Inventors: Franz Goebel, Sudbury; David C. Batson, Amesbury, both of Mass.

[73] Assignee: GTE Government Systems Corporation, Waltham, Mass.

[21] Appl. No.: 936,300

[22] Filed: Dec. 1, 1986

[51] Int. Cl.[4] .............................................. H01M 6/30
[52] U.S. Cl. .................................... 429/115; 429/116; 429/94
[58] Field of Search ............... 429/116, 115, 113, 114, 429/110, 94, 164, 166

[56] References Cited

U.S. PATENT DOCUMENTS

| | | | |
|---|---|---|---|
| 3,575,724 | 4/1971 | Jammet et al. | 429/166 X |
| 3,796,606 | 3/1974 | Lehmann et al. | 429/94 |
| 4,375,504 | 3/1983 | Jensen et al. | 429/115 |
| 4,433,036 | 2/1984 | Horning et al. | 429/116 X |
| 4,499,160 | 2/1985 | Babai et al. | 429/116 X |
| 4,517,736 | 5/1985 | Goebel | 29/623.2 |

FOREIGN PATENT DOCUMENTS 1277752 10/1961 France .................................. 429/94

*Primary Examiner*—Anthony Skapars
*Attorney, Agent, or Firm*—J. Stephen Yeo

[57] ABSTRACT

A reserve cell has cylindrical electrodes surrounding a cell component container, all in a cylindrical housing. A shim has a circular groove accepting one end of an electrode and a socket holding one end of the container. The outer edge of the shim abuts the inner wall of the housing. This arrangement maintains spatial relationships of the cell.

1 Claim, 4 Drawing Figures

ELECTROCHEMICAL CELL WITH CONTAINER SUPPORT

COPENDING APPLICATIONS

Copending application Ser. No. 847,993, filed Apr. 3, 1986, for *Electrochemical Cell With Novel Anode Geometry*, by Goebel and Batson, is directed to a cell having an anode with a single turn spiral gap.

Copending application Ser. No. 936,299, filed concurrently with this for *Electrochemical Cell With Interlocking Anode Support* is directed to a cell having a perforated cylinder for supporting an anode.

Copending application Ser. No. 936,298, filed concurrently with this for *Electrochemical Cell With Disc Activator* describes a reserve cell in which activating pressure is communicated to a container by means of a disc located in a channeled ring.

BACKGROUND OF THE INVENTION

This invention pertains to electrochemical cells and more particularly is concerned with liquid cathode reserve cells.

To prevent parasitic discharge, it is known to keep the electrolyte separate from the other cell components during storage until activation. Cells having this feature are known as reserve cells.

A cylindrical reserve cell disclosed in U.S. Pat. No. 4,517,736 by of Franz Goebel and assigned to GTE Communications Products Corporation. The cell includes a lithium anode, a carbon cathode current collector structure, and a porous separator interposed between the lithium anode and the carbon cathode current collector structure. The carbon cathode current collector structure is pressed against the interior wall of a metal housing and is arranged concentrically within the housing with the separator and lithium anode. The assembly of the lithium anode, carbon cathode current collector structure and separator is then exposed to an electrolytic solution including a reducible liquid cathode solvent and an electrolyte solute dissolved in the reducible cathode solvent. Suitable materials for the reducible cathode solvent and the electrolyte solute are thionyl chloride and lithium tetrachloroaluminate, respectively.

An ampule containing a liquid cell component, i.e., a ready-to-use or concentrated electrolyte solution, is centrally located in the cell, surrounded by the anode. The cell can be stored indefinitely until the cell is activated by breaking the ampule to release its contents.

Upon breaking the ampule, it is necessary for the electrolyte to flow past the anode to reach the porous separator and the carbon cathode collector structure. The anode material is not porous, so a conduit for the liquid cell component must be provided.

In copending application Ser. No. 847,993, filed Apr. 3, 1986, for *Electrochemical Cell With Novel Anode Geometry*, by Goebel and Batson, there is described a cell wherein the anode is cylindrical with a single turn spiral slot extending between its ends. The slot provides passage for the electrolyte to flow past the anode regardless of the cell's orientation.

The electrodes of these cells are thin and by nature subject to collapse under high forces, such as those encountered during acceleration when fired from a gun or upon activation. Such a collapse would likely result in a short circuit.

Another cylindrical reserve cell is described by Babai et al in U.S. Pat. No. 4,499,160. In the Babai et al cell, a cylindrical metal conductor 5 surrounds a centrally located ampule. In one embodiment, an anode is in contact with the cylindrical metal conductor. The anode is provided with a plurality of small holes said to enhance permeation of the electrolyte upon release. Such holes necessarily reduce the active area of the anode and incur additional manufacturing costs.

An object of the invention is to provide a cell having an anode arrangement capable of withstanding high acceleration forces.

SUMMARY OF THE INVENTION

A reserve cell has cylindrical electrodes surrounding a cell component container, all in a cylindrical housing. A shim has a circular groove accepting one end of an electrode and a socket holding one end of the container. The outer edge of the shim abuts the inner wall of the housing. This arrangement maintains spatial relationships of the cell.

DETAILED DESCRIPTION OF THE INVENTION

Figure 1:
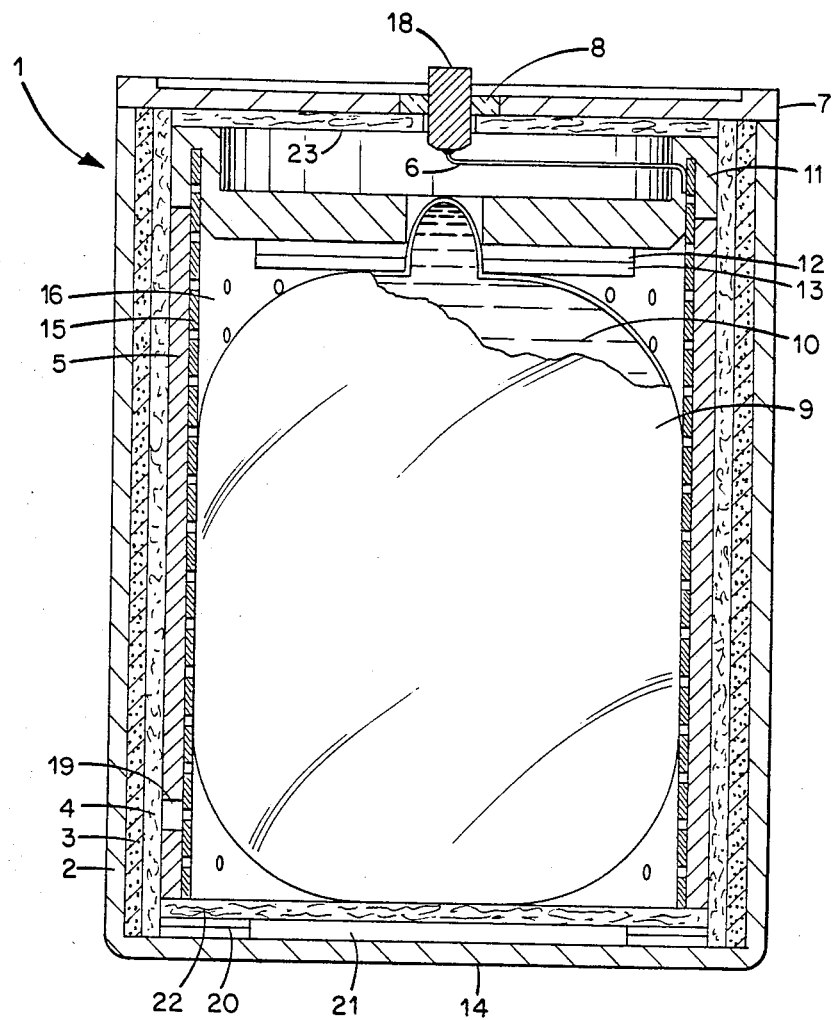
FIG. 1 is a cross-section of a cell which embodies the invention.

Referring now to FIG. 1, there is shown a reserve type electrochemical cell 1 embodying the invention.

In the embodiment shown, the cell 1 has an elongated cylindrical metal housing 2 which may be a stainless steel tube having a closed end 14 and an open end. Disposed within the housing 2 is a concentric cylindrical arrangement of a cathode current collector electrode member 3, a thin porous separator 4, an anode electrode member 5, an anode support cylinder 15, and a centrally located liquid cell component container 9. The arrangement of these four components 3, 4, 5, 15 is collectively referred to as a battery stack.

The aforementioned cathode current collector structure 3 is preferably a porous carbon bearing element including an elongated cylindrical metal screen.

The porous carbon element may be produced by compressing an aggregation of discreet semi-tight porous carbon conglomerates on both sides of the metal support screen which may be nickel or stainless steel. The conglomerates of the element as described hereinabove generally contain a combination of carbon black, graphite, and a binder such as polytetrafluoroethylene. By virtue of the porous nature of the above ingredients when compressed together, a network of electrolyte-conducting channels are established throughout carbon element whereby the carbon element can be permeated by electrolytic solution. Techniques for producing the conglomerates employed by the carbon element are described in detail in U.S. Pat. No. 4,161,063 to which reference may be made for specific details.

The cathode current collector 3 physically abuts the interior wall of housing 2 and forms an electrical connection therewith, establishing the housing 2 as the positive terminal of the cell.

The aforementioned porous separator 4 is disposed intermediate to the cathode current collector structure 3 and the anode 5 and is used to electrically isolate the cathode current collector structure 3 from the anode 5. The separator 4 typically takes the form of a cylindrical sheet of a standard, electrically non-conductive material such as glass paper.

Figure 2:
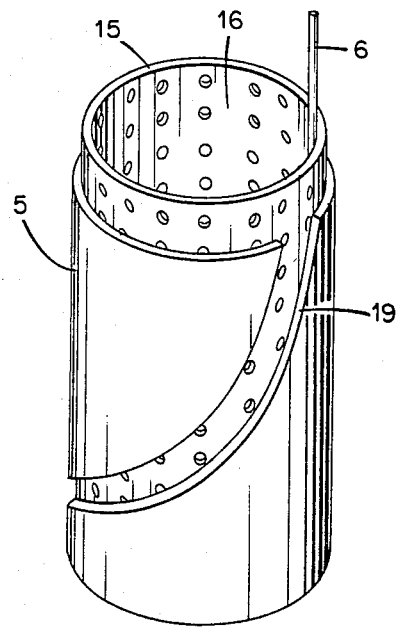
FIG. 2 is a view of the anode-support assembly used in the cell.

As seen in FIG. 2, the anode 5 is preferably a elongated cylindrical sheet of an oxidizable active alkali metal such as lithium formed as a hollow open-ended cylinder with a single turn spiral gap 19 running between the ends of the cylinder. The anode is originally a solid metal (i.e., lithium) sheet shaped as a parallelogram without right angles. The sheet is wound into a cylinder about the anode support cylinder 15, leaving the spiral gap 19 or slot between adjacent edges.

The anode support cylinder 15 is formed from a flat sheet of perforated metal such as 7 mil stainless steel. Adjacent edges are welded together to make a continuous perforated cylinder wall without gaps or overlap. The anode 5 is pressed to the anode support structure until some of the electrode metal flows into the perforations. A cylindrical die and press may be used for this operation. This provides mechanical interlocking, so that the anode is supported even during acceleration. Anode support cylinder 15 has the additional function of anode current collector.

Returning to FIG. 1, there is seen a thin, flexible, electrically conductive metal jumper element 6 is physically and electrically connected between the anode support cylinder 15 and a metal feedthrough member 18. The feedthrough member 18 passes through a standard insulator glass or ceramic to metal seal 8 provided within a hermetically sealed cap or cover 7 of the cell 1. The free end of the feedthrough member serves as a negative terminal of the cell.

Jumper element 6 may be of nickel in the form of a wire or flat ribbon and secured to the anode support cylinder 15 in any suitable way, such being welded. The other end of the jumper element is secured to the feedthrough member 18.

The jumper element 6, by virtue of its non-rigid, flexible nature and small thickness, for example, 0.005–0.015 inch, serves to absorb any shock or vibration to which the cell 1 might be exposed, thereby to prevent a break in the physical and electrical connection between the anode support cylinder 15 and the feedthrough member 18, and also to minimize the possibility of physical damage to the glass or ceramic-to-metal seal 8 due to such factors as shock and vibration.

Container 9 is a reservoir which contains a quantity of liquid cell component such as concentrated or ready-to-use electrolyte solution. A suitable and preferred electrolytic solution is a cathode electrolyte solution including a reducible liquid cathode solvent, such as thionyl chloride, and an electrolyte solute, such as lithium tetrachloroaluminate, dissolved in the thionyl chloride (for example a 0.9 mol of lithium tetrachloroaluminate solution).

Container 9 is made of an electrically non-conductive material which may be pierced or broken to release its contents and activate the cell 1. Preferably, the ampule is broken by firing a pyrotechnic near end 14. The container 9 is preferably a glass ampule centrally located in a central well 16 defined by anode support cylinder 15.

Figure 3:
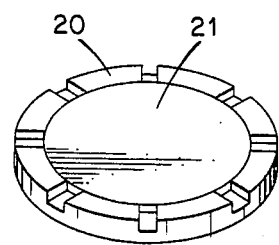
FIG. 3 is a detail showing a channeled ring and activating disc used in the cell.
Figure 4:
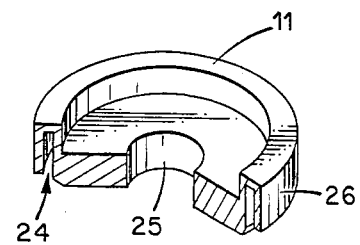
FIG. 4 represents a container support shim used in the cell.

As a feature of the invention, one end of container 9 is supported by a circular shim 11 which spaces container 9 from cap 7. As seen best in FIG. 4, shim 11 has a circular groove 24 which fits over one end of anode 5 and anode support cylinder 15 and a central socket 25 which holds and centers one end of ampule 9 within the anode and anode support cylinder 15. Shim 11 has an outer edge 26 which abuts the housing wall and prevents movement of anode 5 and anode support cylinder 15 within the housing 2. Resilient pads 12, 13, between shim 11 and container 9 urge the container 9 toward insulating ring 20 at closed end 14 of housing 2. As seen best in FIG. 3, insulating ring 20 has radial channels to provide fluid communication between container 9 and the battery stack.

Firing the pyrotechnic causes the center of end 14 to bulge inwards. Ring 20 has the additional function of protecting the battery stack from being deformed as it is located between the battery stack and the closed end.

A solid insulating activating disc 21 is located in the center of insulating ring 20 to transmit pressure from housing end 14 to container 9 while preventing distortion of ring 20. Porous insulating discs 22 and 23 at the ends of cell 1 contain fragments of container 9.

The advantage of the invention is best appreciated when the cell is transported prior to activation, such as being fired from a gun. The position of the container is maintained regardless of rotational forces.

The best embodiment of the invention has been described. It will appear that many modifications can be made to a cell yet remain within the scope of the claims.

What is claimed is:

1. A reserve cell comprised of:
a cylindrical metal housing having an interior wall;
a cylindrical first electrode member abutting said interior wall;
a cylindrical second electrode;
a cylindrical porous separator interposed between said first electrode member and said second electrode member;
a cell component container centrally located within said housing; and
a circular shim having a central socket, a circular groove, and an outer edge, said groove accepting one end of second electrode and anode support cylinder and said socket holding one end of said container, said outer edge abutting the inner wall of said housing for supporting the spatial relationships of the cell.

* * * * *

UNITED STATES PATENT AND TRADEMARK OFFICE
CERTIFICATE OF CORRECTION

PATENT NO. : 4,684,588
DATED : August 4, 1987
INVENTOR(S) : Franz Goebel et al

It is certified that error appears in the above-identified patent and that said Letters Patent are hereby corrected as shown below:

On the Title Page:

Immediately after the Title, insert the following:

The U.S.Government has rights in this invention pursuant to Contract Number DAAK10-84-C-0108 awarded by the Department of the Army .

Signed and Sealed this

Twenty-seventh Day of December, 1988

*Attest:*

DONALD J. QUIGG

*Attesting Officer*  *Commissioner of Patents and Trademarks*